United States Patent [19]
Glatfelter

[11] Patent Number: 4,912,625
[45] Date of Patent: Mar. 27, 1990

[54] GRAPHICS VERIFICATION SYSTEM FOR NUMERICAL CONTROL PROGRAMS

[75] Inventor: John W. Glatfelter, West Chester, Pa.

[73] Assignee: The Boeing Company, Seattle, Wash.

[21] Appl. No.: 102,682

[22] Filed: Sep. 30, 1987

[51] Int. Cl.⁴ ............................................. G05B 19/18
[52] U.S. Cl. .................. 364/192; 364/474.23; 364/474.26
[58] Field of Search .............. 364/474.22, 474.23, 364/474.26, 191, 192

[56] References Cited

U.S. PATENT DOCUMENTS

| | | | |
|---|---|---|---|
| 3,857,025 | 12/1974 | English et al. | 364/475 |
| 4,385,349 | 5/1983 | Ashford et al. | 364/184 |
| 4,490,781 | 12/1984 | Kishi et al. | 364/191 |
| 4,519,026 | 5/1985 | Nozawa et al. | 364/167 |
| 4,530,046 | 7/1985 | Munekata et al. | 364/191 |
| 4,556,833 | 12/1985 | Kishi et al. | 364/474 |
| 4,571,670 | 2/1986 | Kishi et al. | 364/171 |
| 4,575,791 | 3/1986 | Schwefel | 364/168 |
| 4,587,608 | 5/1986 | Kishi et al. | 364/191 |
| 4,633,409 | 12/1986 | Sekikawa | 364/474 |
| 4,636,938 | 1/1987 | Broome | 364/191 |
| 4,642,754 | 2/1987 | Kishi et al. | 364/191 |
| 4,644,460 | 2/1987 | Kishi et al. | 364/171 |
| 4,646,228 | 2/1987 | Ikeda | 364/192 |

Primary Examiner—A. D. Pellinen
Assistant Examiner—Jeffrey A. Gaffin

[57] ABSTRACT

A system which allows manufacturing personnel to check the tool path of a numerical control program by graphically displaying the positioning motion of the tool is provided. Four functional modules receive numerical control data and provide a graphic representation of the data prior to its application to a tool to be controlled. The numerical control data is of the type normally carried on a punch-tape or its equivalent, and the system provides an output display by which the accuracy of the data in the punch-tape can be verified.

3 Claims, 3 Drawing Sheets

GRAPHICS VERIFICATION SYSTEM FOR NUMERICAL CONTROL PROGRAMS

BACKGROUND OF THE INVENTION

The present invention relates, in general, to a system for evaluating the quality and accuracy of numerical control programs of the type used to produce machined parts on numerical control machines. More particularly, the invention is directed to a system for simulating the numerical control program exactly through the use of a graphics system to thereby eliminate the need for testing the program on the actual machine tool, and to eliminate the down time of the tool that would normally be required for testing of the program.

Traditionally, personnel wanting to provide control instructions for numerical control machine tools such as a milling machines, plotters, routers, horizontal and vertical mills, robots and the like, will use manual as well as automatic methods for generating punch-tape file containing the numerical control instructions. The punch-tape file is the vehicle for feeding the required information to the machine to be controlled, and may take any one of many known forms including perforated tape, magnetic tape, and the like. The control data carried by the tape is then supplied to the machine where a tape try-out cycle is exercised. This try-out cycle, or dry run, is then used to evaluate the integrity of the numerical control program and to assure the programmer that the machine tool will perform as desired. Typically, such dry runs are needed whenever a change in the numerical control instructions is effected, or when a new program is being introduced. However, this is a time-consuming process which not only takes the machine out of production, but also requires the valuable time of the machine tool operator and the numerical control programmer, and requires the use of sample material Various attempts have been made to produce systems for testing numerical control programs without requiring a shut down of a production machine each time a minor change in the numerical control instructions is made, such as might be brought about by a small revision in an engineering drawing. U.S. Pat. No. 4,519,026 to Nozawa and U.S. Pat. No. 4,530,046 to Munekata et al are examples of such systems which provide visualization of a numerical control. However, in both of these cases, and as typical in prior art test systems, the visualization is provided by a display of the information placed in the machine by the operator, and not by a display of the final machine controller data; that is, of the actual machine code.

Crucial to the value of a simulation and verification process in the data which is actually being simulated. Numerical control programs typically are transformed through several steps before actually being loaded into the machine tool which they will drive. Although a numerical control program, when developed, may be quite accurate, such a program may be used to drive machine tools having different control characteristics. For example, the machines could be manufactured by a variety of manufacturers, or by one manufacturer at different times under different model numbers. To convert a general program into a program for a specific machine, a format table which uniquely describes the machine controller must be used to convert the general program to produce the final machine code which is used to drive a particular machine. Without a validation of this final machine code, there can be no assurance that the final product will produce a high quality result, and it is for this reason that, in the past, it has been necessary to actually operate the machine tool in order to determine the quality of numerical control program.

BRIEF DESCRIPTION OF THE INVENTION

Accordingly, it is an object of the present invention to provide a system for graphically verifying the actual machine code used in a numerical control program.

A further object of the invention is to provide a verification system for simulating the machine code produced from a numerical control program which has been formatted and is in a form ready for use with the machine tool which it will drive.

It is another object of the invention to provide a graphics verification system for a numerical control program wherein the machine code can be validated without committing machine time, sample materials, or operator time for test purposes.

The present invention is directed to a system which allows manufacturing personnel to verify the machine operation produced by a finished numerical control program produced from any desired source, such as by a computer aided design (CAD) system. The machine operation is graphically displayed so that its motion can be verified prior to use of the machine program on the machine tool itself. This verification process is accomplished at a graphics verification station located remotely from the manufacturing tool so that such verification can be accomplished without requiring commitment of resources in the manufacturing facility.

The image which is simulated by the system of the present invention for display is that which is produced by machine or tool motion in response to the data on a punch-tape file, that is, of motion produced by fully processed numerical control data which has been formatted for the specific machine which is to be controlled, so that the actual machine code is used for the verification testing. Briefly, and in accordance with the present invention, a numerical control (NC) program is produced from any of several different conventional sources. These may be, for example, IDS, CADAM, CATIA, TSO/APT, or other computer aided design or computer assisted manufacturing systems which are known and available for producing programs for controlling machine tools, robots, and the like. The numerical control program produced from one of these sources preferably is a generalized program capable of controlling machine tools of a known type, such as a milling machine, but from any one of several manufacturers, each of which may require a slightly different format. The numerical control program is stored in a punch-tape file, or equivalent storage, for use in the machine to be controlled.

In order to test the numerical control program, the data which is to be verified is supplied to the subject verification system, instead of being used to operate a machine. The numerical control data which is stored on the punch-tape file is supplied to the test system by way of an input module which loads the numerical control data into the system for processing. An identification module receives the input data and also incorporates a machine controller library which contains the definitions and parameters required to correctly convert the punch-tape file data to a particular machine to be controlled. The identification module selects the correct conversion information from the machine controller library and supplies it to a conversion module where the numerical control data is converted to the output format required for the selected machine.

An output module receives converted numerical control data from the converter module and directs it to a selected display device and/or to a printer, as desired by the operator. The output module generates display data for visual simulation of the specific, selected machine tool operation, as it would be controlled by the data being verified. Alternatively, or in addition, print data can be generated for the same purpose. In a preferred form of the invention, the converted numerical control data is displayed on conventional CADAM or on conventional CATIA graphics, as desired by the operator. In the case of a CADAM display, the system creates a CADAM model, providing data which will represent either the geometry of the work piece being produced, the tool path, or both. A two dimensional, X-Y representation is provided in the CADAM system, which allows the operator to view the resultant model on a graphic display. Conventional CADAM systems include a replay option under which numerical control data may be operated to provide a step by step display of the tool path on a cathode ray screen, and this replay option is used by the present invention for display of the converted numerical control data.

In the case of a CATIA model display system, the system of the present invention allows the user to activate the usual CATIA replay operation to permit a graphic three-dimensional display of the final machine tool path produced by the machine code. It will be understood that CADAM, or Computer Aided Design And Manufacturing system, and CATIA, or Computer Aided Three-dimensional Interactive Application, are systems which are known and commercially available, and in and of themselves are not a part of the present invention, but are used in conjunction with the inventive system.

The present invention thus provides a system for graphically simulating a numerical control program exactly, using the machine code for the particular machine that is to be operated, and displaying the results of the program using a known graphics display system. The invention is generalized in that it can process input data from any numerical control program source, and can produce a graphics output which is tailored for any specified machine tool. The present system reduces the need for try out cycles, or dry runs, on machine tools, thereby eliminating down time for such tests, reduces the loss of sample material, and significantly improves the quality of the numerical control program. In addition, the system improves the safety conditions for the machine operator by eliminating unnecessary test runs and by avoiding tests of programs which might endanger the operator because of errors. Further, the present invention results in a significant savings of time in the production of numerical control tapes.

BRIEF DESCRIPTION OF THE DRAWINGS

The foregoing, and additional objects, features and advantages of the present invention will become apparent to those of skill in the art from a consideration of the following detailed description of a preferred form thereof, taken in conjunction with the accompanying drawings, in which.

DESCRIPTION OF THE PREFERRED EMBODIMENT

Figure 1:
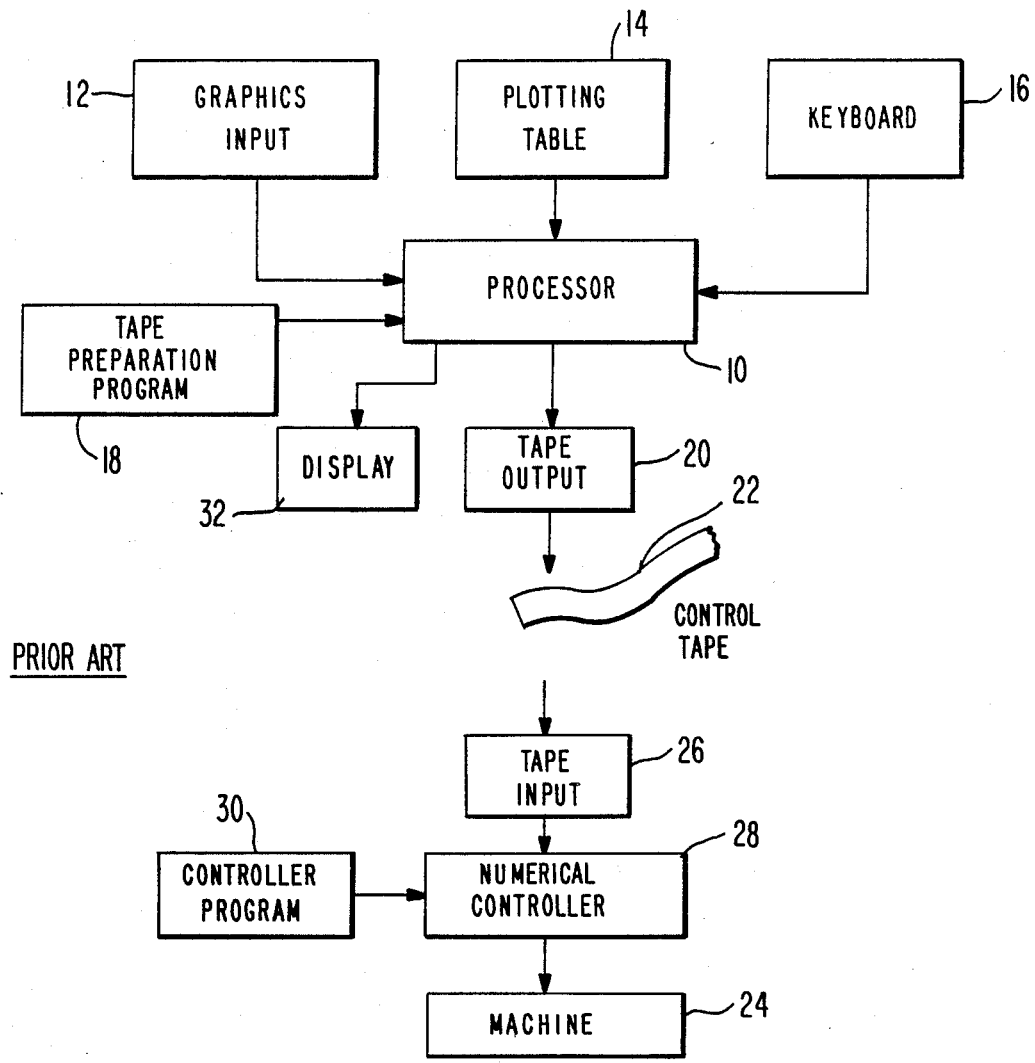
FIG. 1 is a block diagram of a prior art numerical control system.

The use of computers for controlling machines of various types is now well developed, and highly sophisticated systems are available for carefully regulating the operation of various types of machine tools, robots and the like. In general, such prior art systems utilize a processor such as that illustrated at 10 which receives inputs from any one of a variety of sources which describe the desired motion of a tool which is to be controlled. Suitable sources include a graphic input such as that indicated at 12, a plotting table 14, a computer keyboard 16, or the like. The processor 10 is programmed, as by a tape preparation program from a source 18, to convert the variables which describe the desired machine or tool motion into coordinates which define the path of the tool, its rotation, its tilt, and similar parameters. The machine motions are expressed in terms of equations, the coefficients of which can be expressed in terms of differences which can be then used to regenerate the original motions described by those equations. The coefficients are supplied via a tape output 20 from the processor to a control tape 22 which may then be used in conjunction with the machine 24 which is to be controlled. The coefficients, or numerical control data, carried by the control tape 22 are supplied to the machine by may of a tape input 26 and a processor, or numerical controller, 28 which receives the data from the tape and, in accordance with the controller program supplied from source 30, reconstructs the desired tool motion so that the shape or pattern of motion defined by the inputs to processor 10 are then reproduced by the machine 24.

As explained above, however, there is a need to test the control tape 22 for accuracy before it is used in the control of machine 24 in the production of component parts. Prior art systems have taught that a display, such as that illustrated at 32, could be provided to illustrate the data being prepared by processor 10 in order to verify that the correct data has been supplied to the processor by way of the inputs 12, 14, 16 etc. However, in situations there the control tape 22 is to provide a numerical control for any one of a variety of machines which may all be of the same type, but of different models or from different manufacturers, for example, so that each must be slightly differently formatted in order to operate a particular machine, the testing of the input to the control tape does not provide an accurate verification of the numerical control program as it will be applied to the machine. Thus, with prior art systems it was necessary to actually run the machine with the tape in a test mode to see whether the numerical control was correct, and such a process involved unacceptable down time for the machine.

Figure 2:
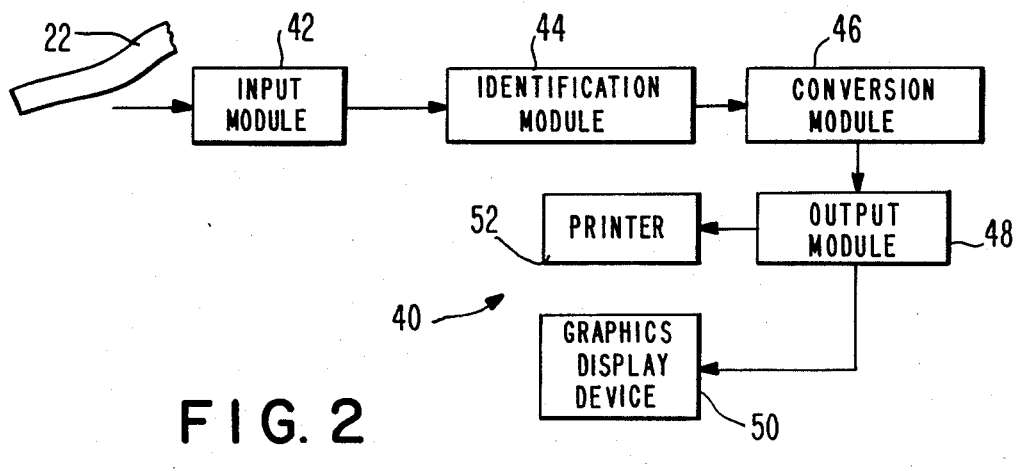
FIG. 2 is a block diagram of the graphic verification system for numerical control programs in accordance with the present invention.

In accordance with the present invention, as illustrated in FIG. 2, data from the control tape, or punchtape file, 22 is supplied to a verification system generally indicated at 40. The verification system does not include the machine to be controlled, but simulates that machine so that the control of a particular designated machine will be graphically illustrated in a display device for evaluation. Thus, in accordance with the invention, data from tape 22 is supplied to an input module 42 which reads the data and then supplies it to an identification module 44. The module 44 includes a machine controller library which includes the conversion parameters that will be required to format the data from the control tape for use with a particular machine. After identification of this machine, the conversion parameters from the library are supplied, together with the numerical control data from tape 22, to a conversion module 46 where the numerical control data is converted to a form that is usable by the selected machine. Thereafter, the converted data is supplied by may of an output module 48 to a graphic display device 50 or to a printer 52, or both, for verification of the machine code which is produced by the conversion module. This machine code is equivalent to the data which is supplied to machine 24 by controller 28 in the system of FIG. 1, and provides an accurate indication of the exact control functions that will be produced by the numerical control data on tape 22. This allows verification of the actual motion of the machine that will be controlled by the tape 22 without the need for a dry run on that machine.

Figure 3A:
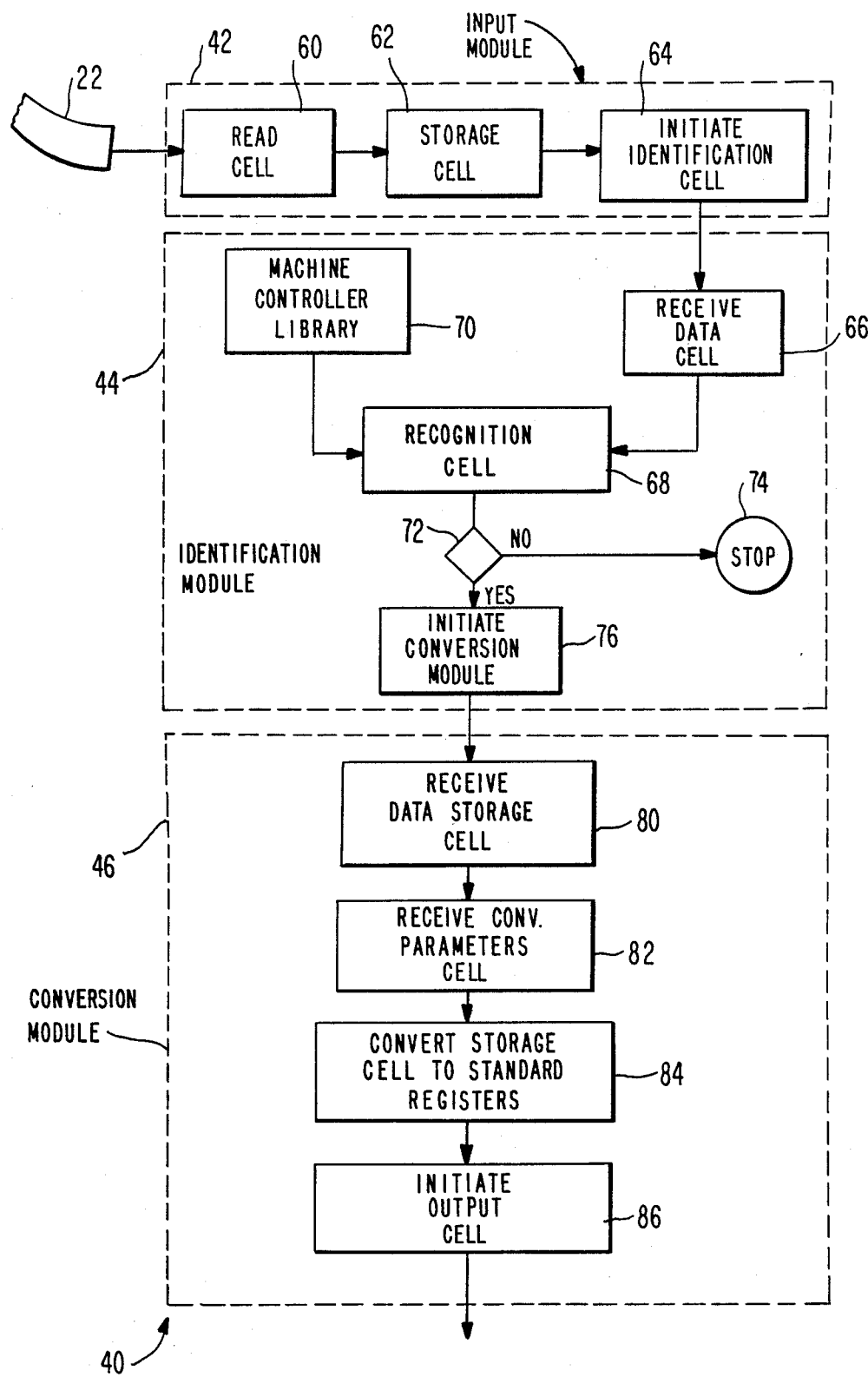
FIGS. 3A and 3B are a more detailed block diagram of the system of FIG. 2.
Figure 3B:
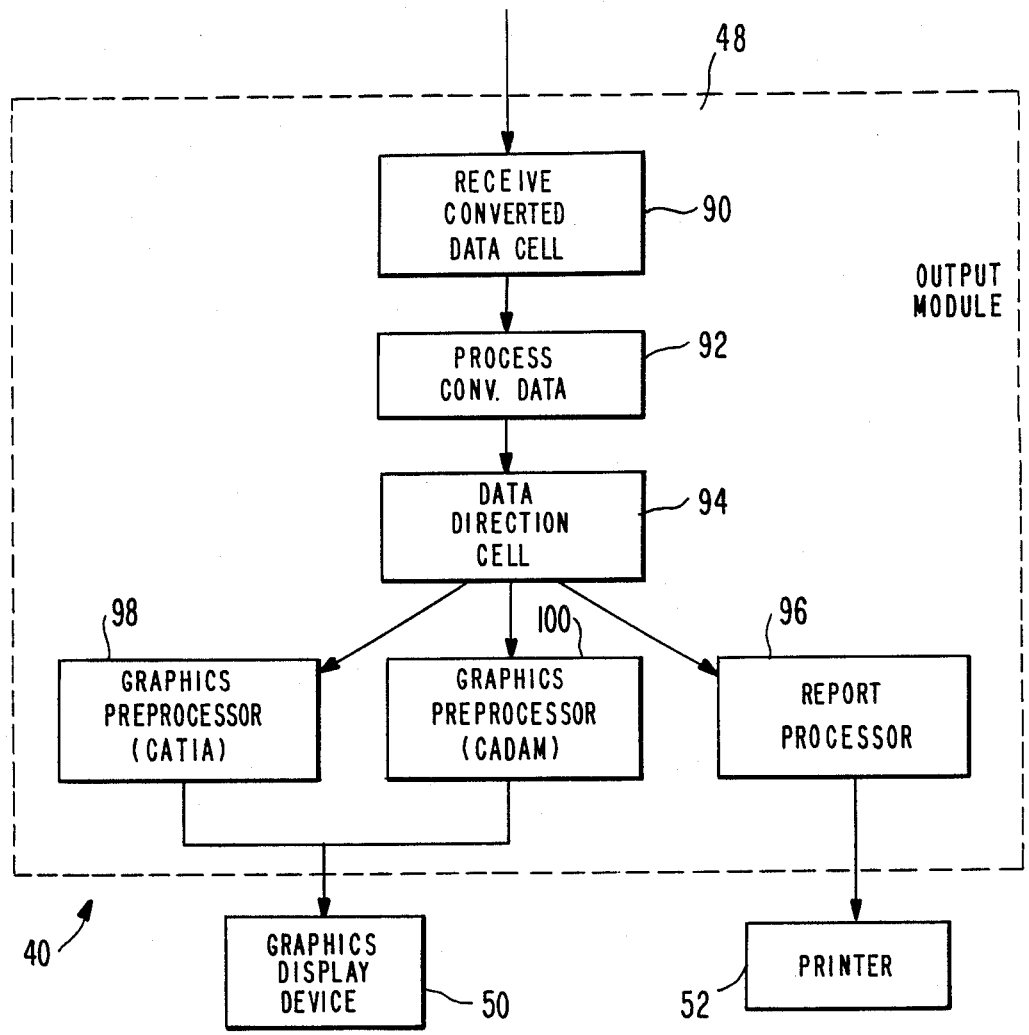

The system of FIG. 2 is illustrated in greater detail in FIGS. 3A and 3B, to which reference is now made. In these Figures, elements common to the preceding figure carry the same reference numerals. Thus, numerical control data from the punch-tape file 22 is supplied to the input module 42 which includes three cells, a read cell 60, a storage cell 62, and an initiate cell 64. The read cell 60 receives data from the punch file 22, and may be any reader device compatible with the form of the punch tape file. Thus, if the tape 22 carries apertures representative of the control data, then the read cell 60 may be a magnetic photosensitive device which responds to the apertures. Similarly, if file 22 is a magnetic tape, then cell 60 may be a read head. The data from punch-tape 22 is moved by the read cell 60 to the storage cell 62 where it is held until required by the remainder of the system. The storage cell may be any conventional storage medium, but in one embodiment may be a random access memory for receiving digital information from the read cell representing the data on punch tape 22. Upon receipt of data by the input module 42, the initiate identification cell 64 responds to activate the identification module 44.

The identification module 44 includes three internal cells which are used to identify the type of punch-tape file data which was received by the input module 44. Thus, when data is supplied to module 44 by way of cell 64, the data is fed by way of a receive data cell 66 to a recognition cell 68. The file data includes information which identifies the machine which is to be controlled, and the recognition cell, in response to that data, calls up conversion data from a machine controller library 70 which is included in the identification module 44. The library 70 contains the definitions and parameters which are required to correctly convert the punch-tape file data from tape 22 to a form which can be used by the machine which is to be controlled by the data. If the recognition cell 68 locates conversion data for the appropriate machine in the library 70, then the processing can continue. If no such conversion data is found, the punch-tape file data cannot be tested, and the processing stops, as indicated by logic decision blocks 72 and 74. If there is a match in library 70, then an initiate cell 76 initiates the operation of conversion module 46.

Conversion module 46 contains four cells which are needed to prepare the punch-tape file data from tape 22 for use by the output module 48. As indicated above, the existence of a match between the machine identified by the numerical control data on tape 22 and the conversion data in the library 70 initiates operation of the conversion module 46 so that the numerical control data is sent to a receive storage cell 80, while the conversion parameters from the library 70 are supplied to a receive conversion parameters cell 82. Thereafter, the conversion module operates to apply the conversion parameters from library 70 to the numerical control data from tape 22 to reformat the control data to one that will operate the selected machine. This conversion occurs in the registers 84 wherein the data in the storage cell 80 is modified to a standard output format which corresponds to the machine to be controlled. The standard registers used for machine control include linear X, Y and Z axis registers, rotating A and B axis registers, circular off-set I, J and K registers, a feed rate register, an auxiliary functions register, a sequence register, a preparatory register and a spindle speed register. All of these registers are loaded with the data from tape 22 in the required machine format, and thereafter the converted data from these registers is supplied by way of an initiate output cell 86 to activate the output module 48 (FIG. 3B).

The data from register 84 cell is received by a receive converter data cell 90 in output module 48 and is supplied to a processing cell 92 which directs the data by way of a data direction cell 94 to a desired output device such as the graphic display 50 or a printer 52. Control over the specific format of the output is exercised by means of the data direction cell 94 which is an internal system switch which can be controlled by the operator. Cell 94 permits selection of the graphic display 50 which generates display data for visual simulation of the machine tool being controlled, or permits generation by way of a report processor 96, of print data for reporting the contents of the registers 84 on a printing device 52.

If the graphic display unit 50 is to be utilized, the data can be formatted for any one of several types of graphics devices. Illustrated in FIG. 3B are two such devices, one a CATIA device, and the other a CADAM device. In the former case, data to be displayed is supplied to a graphics preprocessor 98 for formatting the data for CATIA displays. In the second case, data is supplied by way of a graphics preprocessor 100 for formatting the data for display on a CADAM display unit. Other display formats may be provided, if desired.

The graphics preprocessor 98 provides a suitable file for use in CATIA three-dimensional displays so that the operator of the system may use the various options available in CATIA systems for reviewing the machine control data provided by the system of the invention. The CATIA display package allows the user to step through the sequences of the required tool path which is produced by the numerical control data and to view that path on a graphics display unit including a cathode ray tube. The CADAM preprocessor 100 creates a CADAM model which provides the geometry, tool path, or geometry and tool path of the machine to be operated by the numerical control data The CADAM system provides a two-dimensional representation of the control data so that after completing the simulation described above, the user may view the resulting model on the graphics display unit 50. Again, the user can operate the CADAM system to provide a step by step display of the tool path, if desired.

The system of the present invention thus allows the numerical control programmer to check the tool path of a particular part or machine, independently of the source used to generate the program to permit a graphic verification of the positioning motion prior to the use of the tape on the actual machine to be controlled. It will be understood that the system described above may be implemented by suitable logic circuitry, and by suitable programs which regulate the transfer of data through the system.

Although the invention has been described in terms of a preferred embodiment thereof, it will be apparent that variations and modification may be made without departing from the true spirit and scope thereof, as set forth in the following claims:

What is claimed is:

1. A system for verifying the numerical control of a machine to be controlled, comprising:
    a numerical control file including control data to be verified for controlling the operation of a machine;
    an input module for reading the control data from said control file and for storing said control data;
    an identification module responsive to said stored control data for selecting from a library conversion parameters for converting the control data to a format required for a selected machine to be controlled;
    a conversion module for formatting said stored control data in accordance with said selected conversion parameters;
    an output module responsive to said formatted control data and including means for processing said formatted control data for a graphics display output; and
    graphics display means responsive to said processed formatted control data for providing a display of the machine operation produced by the control data in said numerical control file.

2. The system of claim 1, wherein said output module further includes means for processing said formatted control data for providing a print output, said system further including printer means responsive to said print output.

3. A system for verifying the numerical control data for a numerically controlled machine, comprising:
    a control file including numerical control data for controlling the operation of a plurality of generally similar numerically controlled machines, which control data is to be verified for use in controlling a selected one of said plurality of numerically controlled machines;
    an input module for receiving and storing control data from said control file;
    means storing plural selectable conversion parameters for formatting numerical control data for use in corresponding machines of said plurality of numerically controlled machines;
    means for selecting conversion parameters for converting said stored control data to a format required for a selected machine to be controlled;
    a conversion module responsive to said selected conversion parameters for formatting said stored control data for use with a selected numerically controlled machine;
    an output module responsive to said formatted control data for supplying said formatted control data to a graphics display output; and
    graphics display means responsive to said formatted control data for displaying a simulation of the machine operation produced in the selected numerically controlled machine by the control data in said numerical control file.

* * * * *